Figure 1:
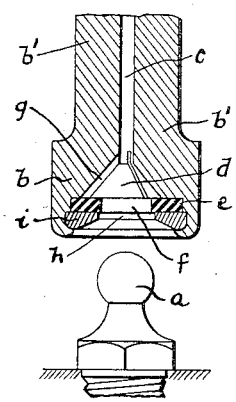

May 5, 1936. H. KREIDEL 2,040,008
COUPLING HEAD
Filed Sept. 27, 1934

Inventor
HANS KREIDEL
By B. Singer
Attorney

UNITED STATES PATENT OFFICE 2,040,008

COUPLING-HEAD

Hans Kreidel, Wiesbaden, Germany

Application September 27, 1934, Serial No. 745,726

7 Claims. (Cl. 285—91)

This invention relates to hose-couplings and more particularly to coupling-heads of hose-couplings for the connection of two ends of a hose which serves for the conveyance of a liquid or fluid from one space into another, for instance for immediately connecting a pressure-pump for a lubricant or a discharge hose of such a pressure-pump or of a lubricant which is kept under the action of pressure with the nipple of a conduit for further conveyance of the lubricant to its place of use, for instance to a shaft-bearing or the like. Said nipple may be provided in the known manner with a non-return or back-pressure valve, or such a valve may also be absent and, besides, may be constructed with an enlarged head which may be of fully spherical conformation or also only of spherical conformation at its under side and of frusto-conical conformation at its upper side.

The coupling-head forming part of the present invention comprises an annular packing disk of compressible material, said disk being provided within an enlargement of the bore or passage-channel of said coupling-head, said space being of a depth sufficient for the reception of the nipple-head. In addition to this, the outer margin of said annular packing disk is in contact with the wall of said enlargement and provided with an aperture permitting to slip the nipple-head therethrough as well as with further means for transmitting the pressure of the liquid or fluid entering the coupling to the surface of said annular packing disk and for simultaneously pressing said liquid or fluid against the latter by action of the nipple.

The pressure of the liquid or fluid acts onto said annular packing disk with the result that the latter will be compressed and said disk can expand only in inward direction, its inner surface will be firmly and tightly pressed round that part of the nipple which extends through said disk. This invention consists further in the employment of a special supporting or abutment disk of hard material for the compressible annular packing disk which is kept fixed in the coupling-head in any desired manner and closes up the latter towards the outside.

A further part of this invention consists in the employment of tongues fixed on the outside of the coupling-head swingably in radial drection. At their under ends said tongues are bent inward at an angle thus forming carrying and gripping members supporting said annular packing disk. The free ends of said tongues extend beyond the inner wall of the annular packing disk and consequently form the boundaries for an aperture whose diameter is smaller than that of the aperture which serves for the insertion of the nipple-head. These swingable tongues are kept together or released by a clamping sleeve mounted slidingly on the coupling-head. Said clamping sleeve may be put onto or withdrawn from the coupling-head. Said tongues may furthermore be made resilient in a manner to permit inward resilient motion with respect to each other. The tongues may also be formed by a closing cover or cap of the coupling-head, said cover or cap being fixed with its upper closed rim to the former, for instance, by means of a screw connection. This invention further comprises an inversely funnel-shaped or circular upper surface or cover for the above mentioned enlargement of the passage-channel permitting swinging motion of the coupling-head about the nipple-head and therewith convenient coupling of these two at different angles with each other. Said upper surface or cover is provided with channels for a part of the liquid or fluid to be carried under pressure against the surface of said annular packing disk. An annular groove open in direction towards the annular packing disk may be provided in this upper surface or boundary of the coupling-head for the purpose of evenly distributing the pressure over said annular packing disk. The liquid or fluid enters said annular groove under pressure through a channel leading into said groove. In case the coupling-head is used as the orifice of a pressure pump that serves for the supply of a lubricant, the connection between said coupling-head and the nipple is effected solely by firmly pressing the former against the latter. Or, in case the coupling-head is used at the free end of the discharge-hose of such a pump, or at the free end of another channel discharging liquid or fluid, the connection between the coupling-head and the nipple is safeguarded by the aforementioned tongues which when being slipped onto the nipple at first swing apart and thereupon engage from underneath by means of horizontal parts thereon which form carrying and gripping members the nipple-head or a projecting rim thereon. In this case an annular portion of the cover of the enlargement in the passage-channel of the coupling-head will likewise come in engagement with the upper part of the nipple-head. Action on the annular packing disk, that is compression of the latter, takes place simultaneously with the conveyance of the liquid or fluid, for instance of a lubricant, through the passage-channel in the nipple.

The accompanying drawing represents two examples of construction of a coupling-head forming part of the present invention.

Figure 2:
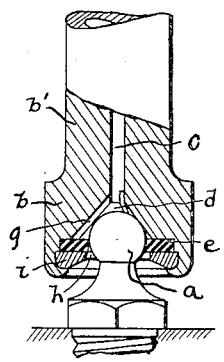
Figure 3:
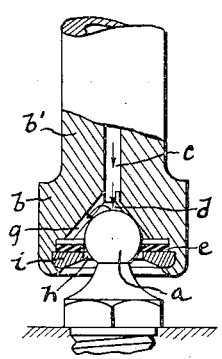

In the drawing, Figs. 1, 2 and 3 are sections, partly in view, showing the novel coupling-head in three different positions with respect to a nipple for proper connection therewith. A coupling of this kind may, for instance, be used in connection with the orifice of a pressure-pump serving for the supply of a lubricant, while Figs. 4, 5 and 6 show, similarly to Figs. 1, 2 and 3, the novel coupling-head connected to the free end of a discharge-hose, in three positions with respect to a nipple, together with special safety appliances serving to firmly secure the coupling-head to the nipple and to prevent incidental separation from the latter.

Figure 4:
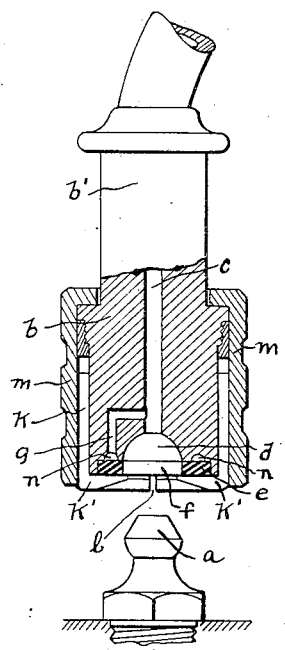
Figure 5:
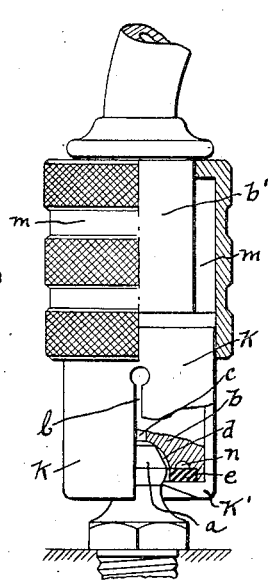
Figure 6:
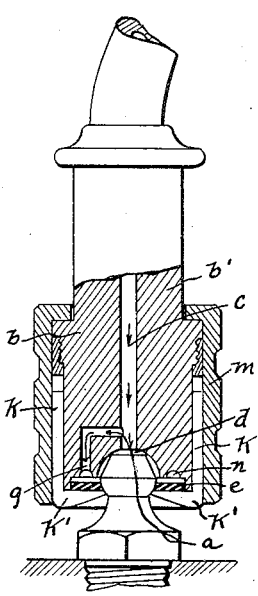

Referring more particularly to the several figures of the drawing, the several coupling-heads are shown in Figs. 1 and 4 separated from the nipple at the end of a discharge conduit, in Fig. 2 in condition pressed against said nipple, in Fig. 5 slipped onto the nipple preparatory to being secured thereto by means of a clamping sleeve preventing incidental separation, and in Figs. 3 and 6 during conveying a liquid or fluid, for instance a lubricant, under pressure through the passage-channel of the nipple and in a condition in which simultaneously with the conveyance of said liquid or fluid a tightening effect is obtained by action of the compressible annular packing disk between the latter and the nipple and in the coupling as a whole. Fig. 5 in particular shows the coupling-head together with the clamping sleeve which serves for fixing swingable tongues formed by a partially slotted closing cap, partly in view and partly in section. All figures show the nipple of the discharge-conduit in view, the nipple being designated throughout with the reference letter $a$, the coupling-head with $b$, the neck of the latter with $b^1$, the passage-channel in the coupling-head with $c$, said passage-channel having an enlargement $d$ of sufficient depth to permit reception of the nipple-head, the annular packing disk that engages at its outer periphery with said enlargement with $e$, said disk consisting of a compressible material, for instance leather, the aperture in said disk with $f$, said aperture permitting to be slipped over the nipple-head, and the additional channels branched off said passage-channel $c$ with $g$, said channels $g$ serving to convey the liquid or fluid set under pressure to said annular packing disk $e$. In the construction shown in Figs. 1, 2 and 3 the annular packing disk $e$ is supported by a further annular disk $i$ of hard material, said latter disk being provided with a passage $h$ for the nipple-head. Said disk $i$ is kept fixed in said coupling-head by rolling inward the free under rim of the latter, thus forming a closure for the coupling-head towards the outside. The aperture or passage $h$ in the supporting disk $i$ is of a diameter which is greater than that of the aperture $f$ in the packing disk $e$ permitting to be slipped over the nipple-head, so that the closing surface of said packing disk projects freely beyond the closing wall of said aperture $h$. In the construction shown in Figs. 4, 5 and 6 the annular packing disk $e$ is supported by the carrying and gripping members $k^1$ forming part of a closing cap screwed onto the coupling-head. Said closing cap is split up from underneath into a plurality of radially swingable resilient tongues $k$ by means of slots $l$ passing in longitudinal direction not fully through said cap. A clamping sleeve $m$ slidingly mounted on the neck $b^1$ of the coupling-head serves to keep either the tongues $k$ in compressed condition and in contact with the coupling-head, or to permit resilient spreading of said tongues $k$ in outward direction, in accordance with the position of said sleeve which may be slid onto or away from said tongues; the free ends of the carrying and gripping members $k^1$ project inwardly beyond the inner periphery of the annular packing disk $e$ and consequently from the boundaries for an aperture whose diameter is smaller than that of the aperture in the disk $e$ for the passage of the nipple-head. This arrangement has the purpose to permit the tongues $k$ to grip with their gripping ends $k^1$ round the nipple-head or the projecting rim on the latter. Prior to applying the coupling-head to the nipple the clamping sleeve $m$ is retracted, whereupon the coupling-head is pressed onto the nipple-head until the latter abuts against the upper surface of the enlargement $d$ in the passage-channel $c$, thereby causing the tongues $k$ to spread apart in radial direction and to again assume their former position in which the ends $k^1$ of the tongues $k$ grip from underneath round the nipple-head. Now the clamping sleeve $m$ is again slid onto the tongues $k$ to keep the latter in compressed condition, thus securing proper connection of the coupling members and prevention against being incidentally separated from each other. If later it is desired to separate the coupling members from each other, the clamping sleeve $m$ is retracted and thereupon the coupling-head taken off the nipple in which case the tongues $k$ together with the gripping members $k^1$ thereon are spread apart in radial direction and slid past the nipple-head to immediately return into their former position.

An annular groove $n$ is provided in the coupling-head for even distribution of the pressure over the annular packing disk $e$, said annular groove being open in direction towards said disk, a channel leading into said groove for supplying thereto a liquid or fluid under pressure.

In the construction shown in Figs. 1, 2 and 3 the upper surface of the enlargement $d$ in the passage-channel $c$ is of the shape of an inverted funnel and in the construction shown in Figs. 4, 5 and 6 of the shape of a circular arc. Both constructions or forms of the enlargement $d$ are destined and adapted to impart a swinging motion to the coupling-head round the nipple-head and to connect the former to the latter at different angles.

After completed connection of the coupling and during passage of a liquid or fluid, for instance a lubricant, under pressure through the passage-channel in the coupling-head and in the nipple, the pressure of said liquid or fluid will also be imparted to the surface of the annular packing disk and compress the latter, with the result that the inner periphery of said disk will be firmly pressed round the part of the nipple that is passed through said disk. For nipples having a thickened head the depth of the enlargement of the passage-channel in the coupling-head is so dimensioned and the arrangement of the annular packing disk therein so chosen that the latter will be positioned underneath the greatest diameter of the nipple-head, if the novel coupling-head is used which forms part of the present invention.

I claim:

1. In a coupling-head, the combination of a member having a passage-channel, with an enlargement in said channel, said enlargement being of a depth sufficient for the reception of a nipple-head, an annular packing disk of compressible material resting within said coupling-head on a fixed support and contacting at its outer periphery with said enlargement, said annular packing disk having an aperture, said aperture permitting said nipple head to be slipped therethrough, and means adapted to convey the pressure of a supply liquid or fluid to the surface of said annular packing disk so as to compress the latter and to firmly and tightly press its inner periphery round the part of said nipple passing therethrough, said enlargement in said passage-channel being provided with a cover having the shape of a circular arc and with further channels for conveying the pressure of the supply liquid or fluid to said annular packing disk.

2. In a coupling-head, the combination of a member having a passage-channel, with an enlargement in said channel, said enlargement being of a depth sufficient for the reception of a nipple-head, an annular packing disk of compressible material resting within said coupling-head on a fixed support and contacting at its outer periphery with said enlargement, said annular packing disk having an aperture, said aperture permitting said nipple-head to be slipped therethrough, a member carried by said coupling-head and adapted to form a supporting surface for said annular packing disk, said member having an aperture permitting insertion of a nipple-head, and means adapted to convey the pressure of a supply liquid or fluid to the surface of said annular packing disk so as to compress the latter and to firmly and tightly press its inner periphery round the part of said nipple passing therethrough.

3. In a coupling-head, the combination of a member having a passage-channel, with an enlargement in said channel, said enlargement being of a depth sufficient for the reception of a nipple-head, an annular packing disk of compressible material resting within said coupling-head on a fixed support and contacting at its outer periphery with said enlargement, said annular packing disk having an aperture, said aperture permitting said nipple to be slipped therethrough, a plurality of tongues fixed to the outer surface of said coupling-head and adapted to spread apart in radial direction, said tongues having inwardly bent ends forming supporting and gripping members to grip round said annular packing disk from underneath, the free ends of said members extending inwardly beyond the inner periphery of said annular packing disk, a clamping sleeve slidingly mounted on said coupling-head and adapted to keep said tongues either in compressed or in spread apart condition, and means adapted to convey the pressure of a supply liquid or fluid to the surface of said annular packing disk so as to compress the latter and to firmly and tightly press its inner periphery round the part of said nipple passing therethrough.

4. In a coupling-head, the combination of a member having a passage-channel, with an enlargement in said channel, said enlargement being of a depth sufficient for the reception of a nipple-head, an annular packing disk of compressible material resting within said coupling-head on a fixed support and contacting at its outer periphery with said enlargement, said annular packing disk having an aperture, said aperture permitting said nipple-head to be slipped therethrough, a closing cap fixed at its upper margin on the outer surface of said coupling-head, a plurality of resilient tongues formed from a cap by longitudinal slots therein, said tongues having their ends directed inwardly at an angle to form supporting and gripping members to grip from underneath round said annular packing disk, the free ends of said members extending beyond the inner periphery of said annular packing disk, a clamping sleeve mounted slidingly on said coupling-head and displaceably on said closing cap, and means adapted to convey the pressure of a supply liquid or fluid to the surface of said annular packing disk so as to compress the latter and to firmly and tightly press its inner periphery round the part of said nipple passing therethrough.

5. In a coupling-head, the combination of a member having a passage-channel, with an enlargement in said channel, said enlargement being of a depth sufficient for the reception of a nipple-head, an annular packing disk of compressible material resting within said coupling-head on a fixed support and contacting at its outer periphery with said enlargement, said annular packing disk having an aperture, said aperture permitting said nipple-head to be slipped therethrough, and means adapted to convey the pressure of a supply liquid or fluid to the surface of said annular packing disk so as to compress the latter and to firmly and tightly press its inner periphery around the part of said nipple passing therethrough, the part that forms the boundaries for said annular packing disk being provided with an annular groove open in the direction towards said disk, said groove being adapted to evenly distribute the liquid or fluid pressure to said annular packing disk.

6. A coupling head having a neck with a passage for fluid under pressure, said passage including a flared portion for the reception of a nipple-head, the walls of the flared portion contacting the nipple-head, said coupling head having a recess at the wider end of said flared portion, a compressible packing disk held in said recess to embrace the nipple-head, said flared portion of said passage having a branch channel to conduct fluid past the place of contact between said nipple-head and the wall of said flared portion.

7. A coupling head for high pressure lubricant conduits with a passage-channel having an enlargement for facilitating the insertion and withdrawal of a nipple-head having a neck, a sealing disk held from yielding outward and made of a material which is compressible under the action of the lubricant pressure, said sealing disk being located at the lower end of the enlargement of the passage-channel, said disk having an opening of an internal diameter approximately equal to the outer diameter of the nipple-head to pass the head through said opening, and means for circumferentially engaging the sealing disk entirely from below to hold the disk against coming out and means to lead the lubricant into said enlargement to compress the body of said disc and thereby constrict said opening around the portion of said head which is adjacent its neck.

HANS KREIDEL.